Sept. 7, 1965

H. G. EASTMAN 3,204,616

ROTOR ENGINE

Filed Jan. 10, 1963

INVENTOR.
HAROLD G. EASTMAN
BY
HIS ATTORNEY

Sept. 7, 1965    H. G. EASTMAN    3,204,616
ROTOR ENGINE

Filed Jan. 10, 1963    3 Sheets-Sheet 2

INVENTOR.
HAROLD G. EASTMAN
BY *M. Ralph Shaffer*
HIS ATTORNEY

Sept. 7, 1965            H. G. EASTMAN            3,204,616

ROTOR ENGINE

Filed Jan. 10, 1963            3 Sheets-Sheet 3

I    IGNITION
     —    FUEL INJECTION
     ▬    COMPRESSED AIR INJECTION

*INVENTOR.*
HAROLD G. EASTMAN
BY *M. Ralph Shaffer*
HIS ATTORNEY

United States Patent Office 3,204,616
Patented Sept. 7, 1965

3,204,616
ROTOR ENGINE
Harold G. Eastman, 848 North 600 West, Provo, Utah
Filed Jan. 10, 1963, Ser. No. 250,682
5 Claims. (Cl. 123—14)

The present invention relates to internal combustion engines and, more particularly, to a new and improved rotor engines wherein metal-to-metal contact is held to a minimum, a high degree of efficiency is insured, and operation is optimized.

Accordingly, a principal object of the present invention is to provide a new and improved rotor engine of the internal combustion type.

A further object of the present invention is to provide a rotor engine utilizing the principles of fuel and compressed air injection, with the advantages attendant thereto.

A further object of the present invention is to provide a rotor engine wherein metal-to-metal contact is held to an absolute minimum.

A further object is to provide a rotor engine wherein rotor and gate means intercooperation is such as to assure a non-scraping cam action therebetween, with the gate means engaging the rotor in a tangential relationship at and beyond the beginning of the power portion of the cycle.

A further object of the invention is to provide a multistage power unit wherein appropriately timed power stages are disposed on opposite sides of a rotor-driven compressor supplying, via constant pressure output receiver means, compressed air to the power stages.

A further object of the invention is to provide a rotor engine wherein injection of compressed air therein is controlled by solenoid valves suitably timed by appropriate means keyed to the engine shaft.

A further object of the invention is to provide in a rotor engine facility for instant starting thereof, this through the immediately available, constant pressure output of the air compressor receiver used therewith.

A further object of the invention is to provide a rotor engine wherein the mechanism for fuel injection, air injection, and spark plug firing are all timed appropriately and keyed to the main shaft of the engine.

A further object is to provide for the automatic advance of both spark and injection as the speed of the engine increases.

A further object is to provide an opposed firing type power unit wherein, preferably, the gating means disposed on opposite sides of the housing of the engine, at compressor chamber surfaces thereof, are co-planar with the axis of the engine shaft.

A further object is to provide in a rotor engine improved means for sealing the rotor and piston face thereof relative to the housing within which the rotor is encased and operatively functions.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figures 1, 2:
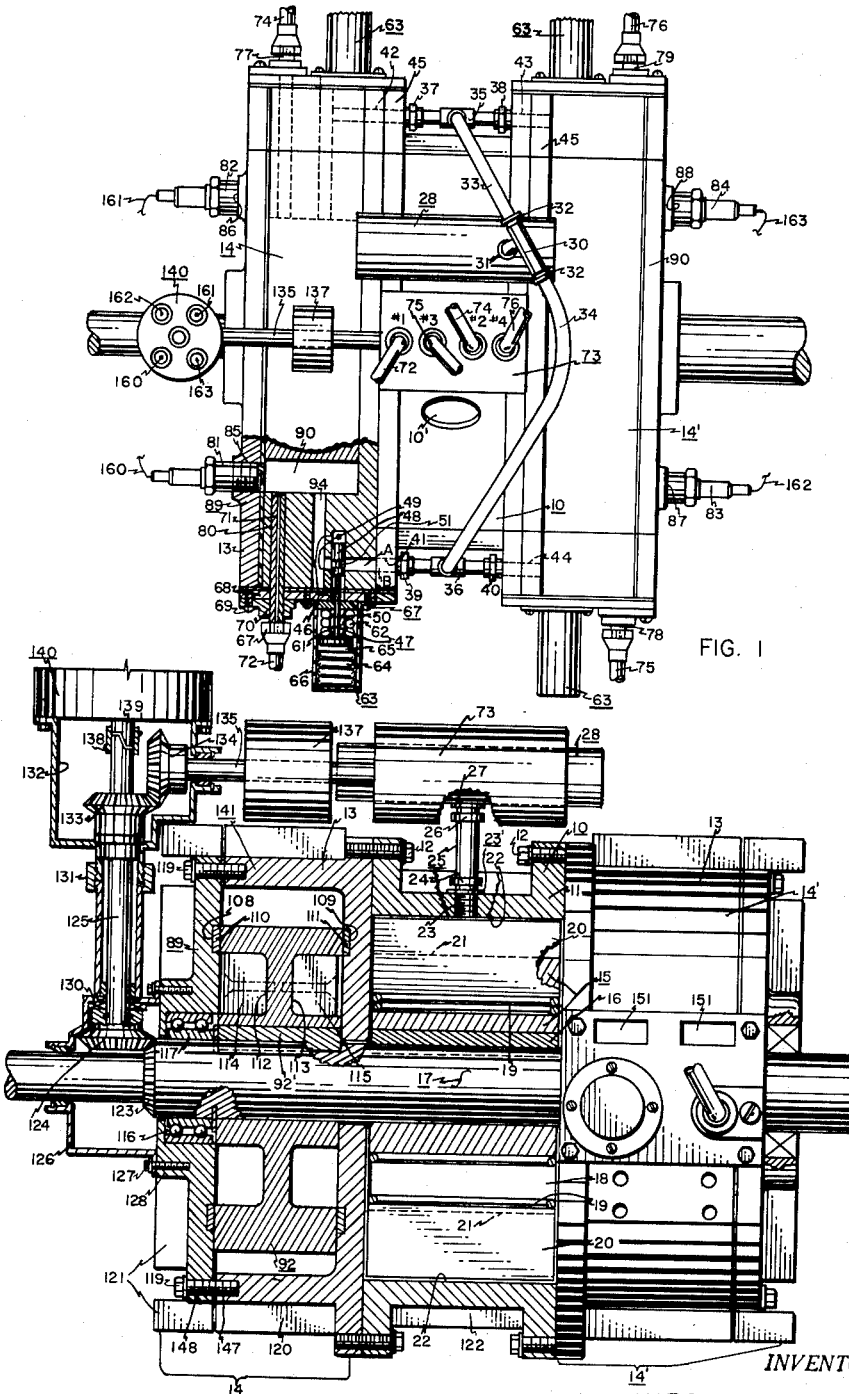
FIGURE 1 is a fragmentary, partially sectioned, plan view of the rotor engine of the present invention in a preferred embodiment thereof; for convenience of illustration, bolt patterns are omitted.
FIGURE 2 is a side elevation, principally in section, of the engine in FIGURE 1, is fragmentary and partially broken away for convenience, and illustrates the parts slightly enlarged widthwise for convenience of illustration.

In FIGURES 1 and 2 air-compressor 10 of the composite engine is shown to be of the conventional, rotor type and includes housing 11 which is bolted by attachments 12 to housings 13 of first and second power stage units 14 and 14'. Air compressor 10 is provided with air intake 10' and also includes a rotor 15, FIGURE 2, which is keyed by key 16 or other suitable means to the engine shaft 17. The rotor 15 is supplied with generally radially extending slots 18 accommodating the respective elliptical springs 19 which back vanes 20. Dotted lines 21 indicate the outer periphery of rotor 15. As is well known in the art, the spacing between the outer periphery 21 of rotor 15 and the interior surface 22 of compressor housing 11 varies in a progressive manner, the vanes 20 working in and out of their respective rotor slots under centrifugal force and under the pressure of elliptical springs 19, so that compression and ultimate exhaust will take place during that portion of the revolvement cycle of rotor 15 within housing 11 wherein the spacing between the two becomes gradually more constricted, and where intake of the compressor is effected during that portion of the rotor revolvement cycle wherein the spacing between housing 11 and rotor 15 increases in dimension. Exhaust port means is disposed at orifice 23, at a position just at the end of the compression portion of the rotor cycle, and may include a union 23' threaded into orifice 23 which receives the threaded end-fitting 24 of conduit 25. The other end of conduit 25 may be constructed as shown in respect to the former end and includes end fitting 26 which is threaded onto union 27 leading into the air receiver 28, of conventional design. The combination of air-compressor 10 and air receiver 28 provides a source of compressed air at constant pressure for timed injection into the rotor engine stages at units 14 and 14' immediately at or just prior to the firing of the same. Thus, T-fitting 30 may be threaded into outlet orifice 31 of the air receiver 28 and unions 32 supply the T 30 so as to accommodate conduit 33 and 34 which are connected between the T 30 and T's 35 and 36. Unions 37, 38, 39, and 40 are threaded into respective air intake orifices 42, 43, 41, and 44 so as to present an immediate supply of compressed air at constant pressure thereat. If desired, and as shown, the compressed air intake orifices 41–44 may include aligned orifices A and B, at each position (41–44) of the power stage unit, in housings 13 and flanges 45 of air compressor 10. Bore 46 in housing 13 forms a cross with orifice A and accommodates a gating piston 47 which includes gate 48, journal boss 49 spaced therefrom to form air passageway 51 and stem 50 which is journaled within bushing 61 of solenoid winding 62 of the solenoid valve 63, forming a part thereof. Solenoid winding 64 is spaced from solenoid winding 62, providing a travel space 65 therebetween. Solenoid housing 66 completes the solenoid valve structure and is mounted by attachments 67 to the housing plate 68. Likewise mounted to plate 68 by attachments 69 is a boss 70 which receives fuel injection nozzle 71, of conventional design, secured to fuel conduit 72 which leads to fuel injection pump 73. In a similar manner, conduit 74, 75, and 76 are connected by conventional attachments to fuel injection nozzles 77, 78, and 79 for the remaining fuel injection nozzles of each of the two power stage units. Provision is made in the housing 13 of each of the power stage units for the fuel injection nozzles 71, 77–79 by respective bores 80. Spark plugs 81–84 are threaded into cooperating bores 85–88 of end-plates 89 and 90 of each of the power stage units. It will be noted that the spark gap portion of each spark plug is disposed proximate the outlet end of its respective fuel injection nozzle. See FIGURE 1. This proximity area of the two lies at the combustion chamber 90 which is formed by that area disposed between piston face 91 of rotor 92, the forward edge 93 of gate 94, and the housing contour of housing 13 at this area which includes compressed air orifice 95 communicating with the portion A of orifice 41. Gate 94 is journaled within bore 96 and itself includes a bore 97 which receives compression spring 98 seating between surface 99 and gasket 100 and plate 101, the latter two being secured by attachments 102 to housing 13. Other types of socket arrangements for the compression spring 98 may be employed. It is conceived that either the spring 98, or an optionally included source of air pressure such as passageway 103 communicating with orifice A, be provided such that adequate pressure, but not more than 50 pounds per square inch pressure, be imposed upon surface 99 for preserving the effective sealing contact of surface 104 of gate 94 with the cam surface 105 of the cam portion 106 of the rotor 92.

It should be mentioned at this point that the fuel and compressed air injection structure at the lower left portion of FIGURE 1 is typical at each of such locations for each of the power units 14 and 14', howbeit, such structural locations for two-cycle power units as illustrated, with reference to power unit 14' in FIGURE 1, will be 90° displaced relative to the positions indicated; the structure at spark plugs 83 and 84 and conduits 75 and 76 have been 90° displaced from their actual positions merely for convenience of illustration.

In returning to FIGURE 2 it will be seen that the housing 13 and end-plate 89 are provided with annular grooves 108 and 109 which accommodate annular sealing rings 110 and 111. Counter-sunk screw attachments and pins, for example, may be used to secure the rings 110 and 111 within the respective grooves 108 and 109. The rings 110 and 111 abut and bear upon rotor 92, and the end plate 89 and housing 13 are assembled together and so dimensioned such that a clearance between the sides of rotor 92 and the end-plate 89 and housing 13 is of the order of a half a thousandth of an inch at at least the rotor eccentric cam portion 106, thereby avoiding metal-to-metal contact therebetween. Rings 110 and 111 may be constituted by graphite-impregnated micarta.

As illustrated in FIGURE 2 the rotor 92, of annular configuration, may for weight-saving purposes be provided with an H-configured cross-section, with the opposite cavities 112 and 113 being provided with suitable counter-weights 114 and 115 for balancing the rotor on shaft 17. Such balancing will of course be needed because of the configurated eccentric cam portion 106, see FIGURE 3, of the rotor 92.

End-plate 89 may include an inner-shoulder 116, FIGURE 2, which seats double ball-bearing means 117 pressed onto and journaling the shaft 17. End-plate 89 is secured to the housing 13 by means of attachments 119 as shown. Housing 13 and end-plate 89 each include respective pluralities of fins 120 and 121, respectively, for cooling purposes. Suitable fins 122 will also be supplied the air compressor 10 at housing 11 thereof. Splined or keyed to or integrally made a part of (as shown), the output shaft 17 is a bevel gear 123 which cooperates with bevel gear 124 keyed to shaft 125. Gear housing 126 is bolted by bolt attachments 127 to bearing boss 128 of end-plate 89. A thrust bearing in the form of a bushing may be disposed at 130 for retaining gearings 123 and 124 in engagement. Extending from housing 126 is a tubular casing 131 which carries within it the shaft 125. A subsequent gear casing 132 encases bevel gears 133 and 134. The latter is keyed to shaft 135 which itself is keyed to fuel injection pump 136 and also to solenoid control mechanism 137. Collar 138 may be provided with set screws and secures distributor shaft 139 to shaft 125. It is thus seen that the revolvement of shaft 17 actuates the distributor in a conventional manner, the conventional injection pump (for example, a Bosch fuel injection pump) in a conventional manner also, and also actuates the solenoid control mechanism 137 in a manner hereinafter to be explained.

Figure 3B:
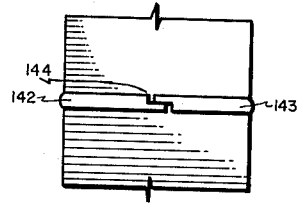
FIGURE 3B is a fragmentary plan taken along the line 3B—3B in FIGURE 3A.
Figure 3A:
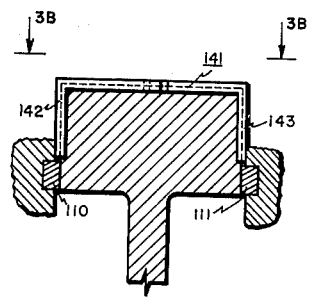
FIGURE 3A is an enlarged section taken along the line 3A—3A in FIGURE 3 and is rotated in a counterclockwise direction, illustrating certain rotor sealing means which may be used in practicing the invention.

A final word as to seals. Sealing rings 110 and 111 in FIGURE 2 have already been explained. Suitable gaskets may be employed between cooperating metal parts where needed. The piston head portion 140 in FIGURE 3 of the rotor 92 will preferably include a transverse seal of step-cut construction as at 141 seated within a staple-configured groove 142 of rotor 92. This is also illustrated in FIGURES 3A and 3B wherein the seal is shown to include at 141 seal segments 142 and 143 which are step-cut at 144 to accommodate the expansion of the seal during heat buildup. The ends of the seal 141 will be disposed immediately adjacent seals 110 and 111, see FIGURES 3A and 2.

If returning for a moment to a general attachment consideration it will be noted that the threaded bores 147 are provided at desired points along the housing, see also FIGURE 2, and suitable apertures 148 disposed in each of the end-plates 89, so that attachment bolts 119 may be employed to secure the end-plate to the housing through cooperation thereof with the apertures 148 and threaded bores 147.

Figure 3:
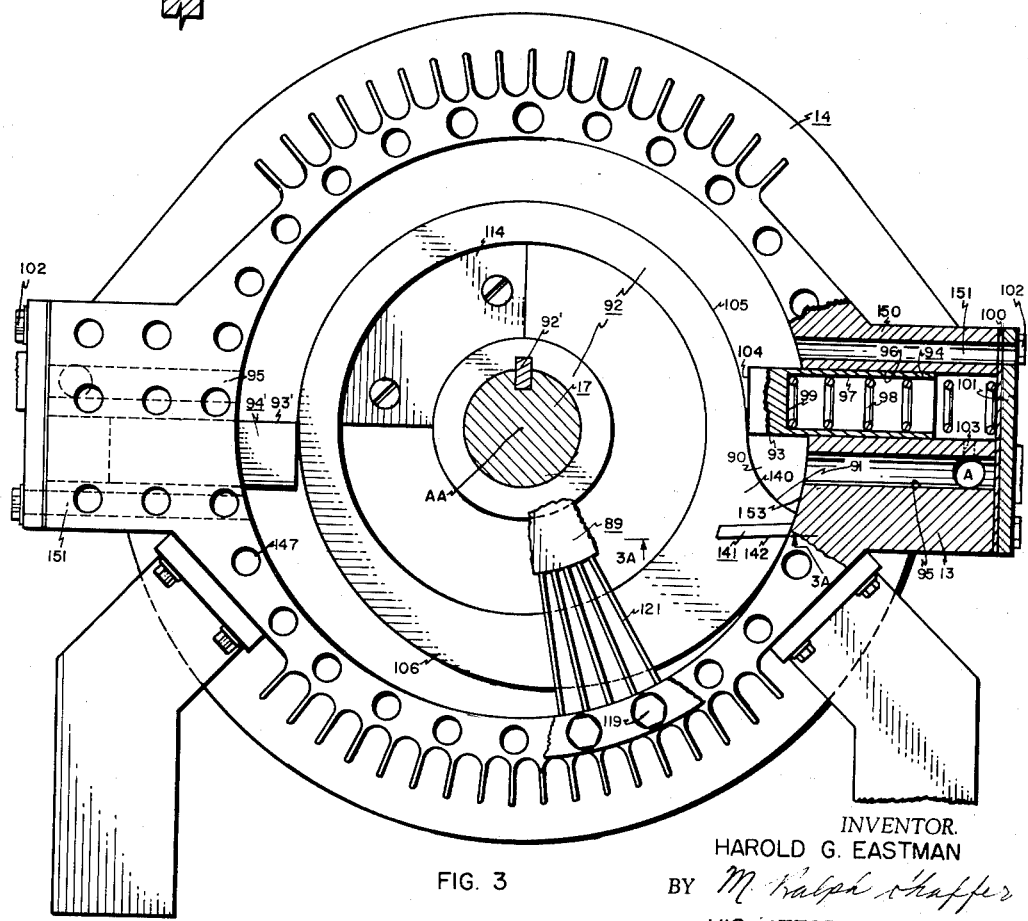
FIGURE 3 is an enlarged end view of the engine of FIGURES 1 and 2 illustrating the same as being mounted upon support feet, the structure of FIGURE 3 being partially sectioned and the end plate thereof broken away for convenience of illustration.

The structure of FIGURES 1–3 operates as follows. FIGURE 3 indicates the position of the rotor 92, at combustion, of the right hand side of the structure. The combustion chamber 90 is formed by the leading edge 93 of gate means 94, by piston face 91, and by the interior periphery 153 of the housing 13. The sequence of operation is as follows. Compressed air is first introduced into the expanding combustion chamber 90 by virtue of the energization of the inside solenoid winding 62 of a respective firing portion of one of the representative stages of the engine. This produces an opening for compressed air, as is seen in FIGURE 1, which causes such compressed air to enter through to orifice 94 in FIGURE 1 into combustion chamber 90. Shortly afterward, the fuel injection pump sends a surge of fuel through conduit 72 to enter nozzle 71 and thence to be injected into the combustion chamber 90. The injection of fuel and compressed air will be cut off by virtue of the conventional action of the fuel injection pump and the energization of solenoid winding 64, this prior to ignition. Upon this cutting off of both fuel and compressed air, a high voltage surge from the distributor 140 is sent to spark plug 81 to produce a spark at this plug, thus causing a firing within combustion chamber 90. Such firing produces a powered rotation of the rotor 92 in FIGURE 3 in a clockwise direction, as such explosion acts upon the piston face 91 and is backed by the gate means 94. It is to be noted that the rotor turns in a clockwise direction, with respect to gate means 94 so that the latter will enjoy an interaction therewith of non-scraping character. For greatest seal between the gate means 94 and rotor 92, it is preferred that the lower surface of gate means 94 and the 180° of periphery of the rotor, which is not a part of the 180° of the rotor's eccentric cam portion at 106, be in tangential relationship. Gate means 94 may be urged against the rotor periphery by either the compression spring 98, or by an auxiliary orifice 103 leading to the compressed air supply, or both. It is desired that about 50 pounds of pressure per square inch be applied to the gate means 94 so that the same may be held in sealing engagement against the periphery of rotor 92.

Rotation of the rotor 92 will ultimately effect an exhaust through exhaust orifice 151 as the piston face rotates about 120°, this magnitude depending upon the operation characteristics desired. Thus, when the piston face 91 begins its registry with orifice 151, the exhaust will commence and will continue throughout a predetermined portion of the effective stroke. For highest efficiency it is preferred that the axis AA of shaft 17 lie in a plane which includes compression chamber surfaces 93 and 93' of the gate means 94 and 94', since maximum power efficiency can be obtained in this manner. Again, seals 141, 110, and 111 accomplish such sealing as is necessary in the construction.

As will be noted in FIGURE 3, the rotor engine takes the form of an opposed firing construction so that a subsequent firing will occur when the piston face 91 achieves a configuration relative to the leading edge 93' of gate means 94' when in the position shown in FIGURE 3 relative to gate means 94. Thus, a second firing occurs relative to power unit 14 at 180°. For balance, the second stage as at 14' may likewise include identical firing structure but 90° displaced with respect to the former so that ignition will occur at 0°, 90°, 180°, and 270° by virtue of the intercooperation of the two power units.

Figure 4:
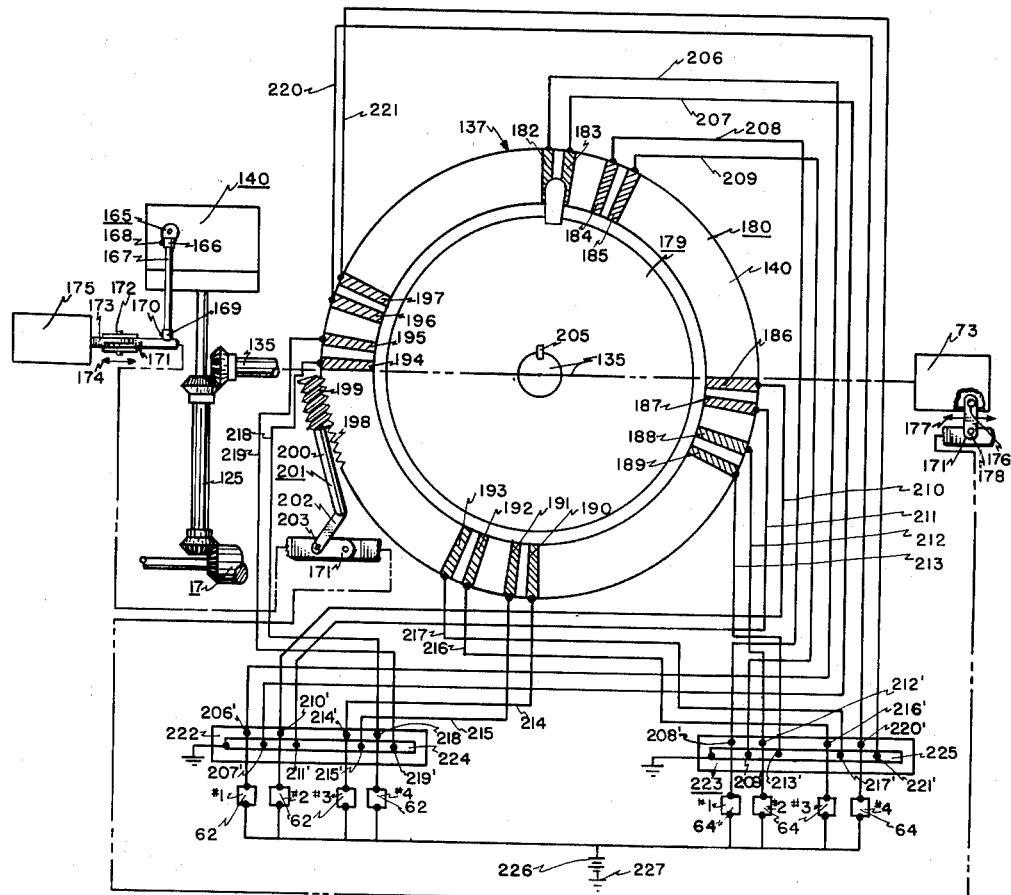
FIGURE 4 is a schematic diagram of a preferred electro-mechanical system which is designed for use in practicing the present invention, and illustrates the means, by which the operative functions are advanced as the speed of the engine is increased, as being coupled to the throttle control in an appropriate manner.

FIGURES 1 and 4 illustrate distributor 140. The same is conventional and includes leads 160, 161, 162, and 163 which connect to the respective spark plugs 81–84 as indicated. The upper part of distributor 140 will also include an ear 165 having a depending boss 166 which interiorly receives rod 167, set screw 168 being provided to secure rod 167 to ear 165 at boss 166. The lower end of rod 167 is received by boss 169, is secured thereto by set screw 170, and thus is directly connected to link arm 171 via boss 169. The link arm 171 may include multiple link portions pinned together as shown and, in any event, is pinned at 172 to link 173 of the throttle control, of conventional design, which through actuation moves back and forth in a direction as shown by the double arrow 174. The throttle control is designated as 175, and link 171 thereof extends to points proximate the solenoid control mechanism 137 and also fuel injection pump 73. There are, of course, innumerable ways of linking together the throttle control with the distributor, solenoid control mechanism 137 and fuel injection pump 73. For illustrative purposes, but one means of linkage is illustrated.

The fuel injection pump 73 will include a conventional arm 176 back-and-forth movement of which in the direction of the double arrow 177 will time fuel discharges from the several nozzles 71 in FIGURE 1 in accordance with the speed of the engine. Hence, link 171 need only be pinned to arm 176 (by pin 178) so that the throttle control will be directly coupled to arm 176 to control fuel injection pump timing.

The solenoid control mechanism 137 is shown to include rotor 179 and a contact ring 180. Rotor 179 may include a protruding, spring-tempered, electrically conductive shorting bar or brush 181 which sequentially contacts and therefore shorts the respective pairs of contacts disposed on contact ring 180. These contacts are designated at 182–197. The contact ring 180 may simply be made of insulative material, as rotor 178, and have the contact elements 182–197 disposed in a flush manner or otherwise upon the surface of the contact ring in contactable relation with shorting bar 181. Contact ring 180 may include a worm wheel segment 198 integral therewith which is driven by a worm 199 or other suitable means to accomplish timing in accordance with the speed of the engine, in order that solenoid actuation and the compressed air injection associated therewith may be advanced together with spark and fuel injection when the speed of the engine increases. Thus, worm 199 may be keyed to stationarily journaled shaft 200 which forms a pivot means of L-crank 201 the arm 202 of which is pinned by pin 203 to link 171. Accordingly, it is seen that back-and-forth movement of the throttle control at its link 173 produces a simultaneous advance (or retard) in timing of both distributor 140, fuel injection pump 73, and the solenoid control mechanism 137. The intercooperation of worm 199 with worm wheel segment 198 causes a clockwise or a counterclockwise rotational displacement of contact ring 188 relative to a chosen position for rotor 179. The physical intercoupling of the distributor 140, fuel injection pump 73, and the solenoid control mechanism 137 has been described in connection with FIGURE 1 and is duplicated and enlarged upon in FIGURE 4 to illustrate specifically that the shaft 135 of FIGURE 1, a take-off shaft from shaft 125 coupled to driveshaft 17, will be keyed at 205 to rotor 179 and also will be keyed to fuel injection pump 73 in a conventional manner. Hence it is seen that distributor 140, solenoid control mechanism 137 and fuel injection pump 73 will be simultaneously driven in mutual correspondence in accordance with the speed of revolvement of motor shaft 17.

Merely one type of direct drive and timing variation has been illustrated; other types may be used as by bell cranks, gears, and so forth.

Contacts 182–197 of contact ring 180 are respectfully connected by leads 206–221 to terminals 206'–221' of terminal buses 222 and 223. Each of the buses 222 and 223 will have shorting bars 224 and 225 which is maintained at ground potential, and terminals whose last digits are "odd" will be directly connected to the same as shown. The terminals whose last digits are "even" will directly connect to one side of each of the respective solenoids 62 and 64 (four of each as shown) at the respective firing structure of each power stage 14 and 14'. See FIGURES 1 and 2. By way of reference, the solenoid 62 when energized functions to open its solenoid valve which then communicates compressed air to the respective firing chamber 90 as formed at rotor firing position. The terminals whose last digits are "even," beginning at 208, are shown directly connected to one side of the respective solenoids 64 which serve to close the respective solenoid valves, see 63 at FIGURE 1, so as to shut off the supply of compressed air to the two power stages 14 and 14'. The remaining sides of solenoids 62 and 64 are shown to be connected to the positive side of a battery supply 226 the remaining side of which is maintained at ground potential at 227. All grounds indicated are common.

The spacing between pairs of contacts, for example, contacts 182 and 183, on the contact ring, and the width of shorting bar 181 will be chosen such that the respective solenoid 62 will be energized at a time and for a given time duration necessary to effect compressed air injection into the associated power stage. While other types of solenoids may be employed such as single-coil, spring loaded devices, the solenoids here used by way of example are double winding solenoids of bi-stable state character. Thus, the solenoid winding 62 of the respective valve must be energized until the valve gate opens, and such valve gate will remain open, through the solenoid 62 is shut off, until solenoid 64 is energized, at which point the plunger at 50 in FIGURE 1 will withdraw rearwardly so as to close the valve. In its simplest form, the solenoid control mechanism 137 is designed such that adjacent pairs of contacts on the contact ring 180 will be disposed within an angle corresponding to the included angle between the forward edge 93 of gate means 94 and the upward extremity of piston face 91 in FIGURE 3, nominally about 10°. This avoids multiple discs, gear reduction means, and so forth. As shown, a one-to-one ratio is preserved herein.

The circuit of FIGURE 4 operates as follows. At "top dead center position," that is, at the configuration shown in FIGURE 3, shorting bar 181 will ride up and contact contacts 182 and 183 which supplies a ground to the top side of the extreme left-hand solenoid 62, thereby opening the solenoid valve associated therewith and enabling compressed air to pass into firing chamber 90. Air continues to pass therein until contact pair 184 and 185 are shorted by shorting bar 181, at which time a ground is supplied corresponding solenoid 64 so as to close the solenoid valve, thus cutting off supply of compressed air to the engine.

At 3 o'clock rotor position, relative to the solenoid control mechanism 137, the firing mechanism at a position 90° displaced from the initial firing structure will be actuated and its solenoid 62 energized through the shorting bar 181 and contacts 186 and 187. Thus, this particular solenoid valve is opened and compressed air is injected into the engine at this firing point and will continue to so pass therein until contacts 188 and 189 are shorted by shorting bar 181, thereby actuating corresponding solenoid 64 and shutting off the compressed air supply. In this way the firing sections of the composite engine structure are sequentially supplied compressed air during predetermined sections of the rotor cycle at selected times.

In a corresponding manner the shorting bar 181 will proceed to contact and short across the contact pairs 190 and 191; 192 and 193; 194 and 195; 196 and 197, to actuate remaining solenoids and thus supply compressed air to the corresponding firing structure sections which correspond thereto at 180° and 270°.

Figure 5:
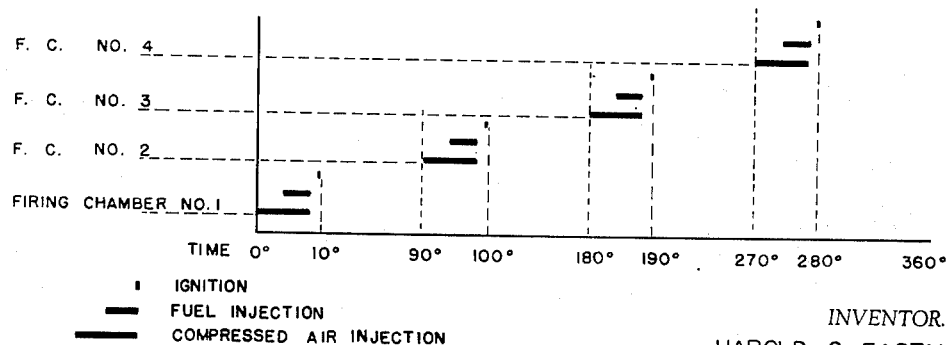
FIGURE 5 is a timing chart indicating sequence of operation of the combustion cycle as related to rotor revolvement (0°–360°).

FIGURE 5 presents a timing chart of the timing functions associated with the combustion cycle per revolution of rotor revolvement. The sequence for each firing chamber (the chambers being 90° displaced relative to each other) is illustrated in FIGURE 5 wherein the duration of compressed air injection, the duration of fuel injection, and spark timing is shown. It will be noted from this diagram that the compressed air injection begins first, after which fuel injection is commenced. Both air and fuel injection terminate, permissively together, before the spark occurs to ignite the fuel. Conceiveably the compressed air and fuel may be pre-mixed prior to injection of the composite fuel air mixture into the cylinder, in which case fuel and air timing would be identical; however, this is undesired since it is contemplated that the engine be operated at a relatively high pressure in the order of 150 p.s.i. relative to compressed air supply. For appreciably lower presures, though a less efficient engine would obtain, pre-mixing might conceiveably be possible.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An engine including, in combination, a pair of rotor engine power units each comprising housing means having two pairs of intakes mutually opposed and two exhaust orifice means mutually opposed, a single driveshaft journaled within and protruding from both of said housing means; a rotor keyed to said driveshaft and disposed inside each of said housing means to revolve therewithin each of said rotors including an eccentric cam portion disposed proximate each of said housing means at at least one portion of said housing means, otherwise radially spaced from said housing means, and said eccentric cam portion being provided with a trailing-edge piston face, a pair of gate means movably disposed within each of said housing means and protruding therewithin, engaging its respective rotor, said gate means being mutually disposed on opposite sides of its respective rotor for retaining said gate means against its rotor during the complete travel path of the latter, means for sequentially injecting fuel through one of each of said pairs of intake orifice means and injecting compressed air through the other of each of said pairs of intake orifice means, each said pairs of intake orifice means opening into spaces between its respective housing means and rotor and between its respective piston face and adjacent one of said gate means, at selected times, and means for igniting thereat said fuel at selected times, each of said gate means being disposed between a pair of said intake orifice means and one of said exhaust orifice means, each of said gate means, each said pair of housing means, intake orifice means and piston face of said rotor being so constructed and arranged to define combustion chambers communicating with said pair of intake orifice means, when said piston face has just passed respective intake orifice means; means for adjustably timing said compressed air injection, fuel injection, and ignition within each combustion chamber and means coupled to said driveshaft coacting with said adjustable timing means for simultaneously advancing the timing sequence of fuel and air injection and ignition of both combustion chambers of both of said rotor engine power units in accordance with the speed of said driveshaft.

2. Structure according to claim 1 wherein each of said housing means includes annular seal means bearing upon said rotor on both sides thereof beneath said eccentric cam portion.

3. Structure according to claim 2 wherein each of said rotors is provided with a staple-configured transverse groove immediately forward of its respective piston face, and wherein each of said rotors includes staple-configured seal means respectively disposed in said groove and comprising portions cooperating in step-cut relationship medially thereof, the extremities of said seal means being proximate said annular seal means, respectively.

4. The structure of claim 1 wherein each of said rotors are provided with a semi-circular peripheral portion throughout 180° of arc, said eccentric cam portion thereof constituting the remaining 180° of periphery, rising gradually from said semi-circular portion until said piston face is reached, and thereat falling sharply until the remaining extremity of said semi-circular portion is reached, said piston face being of concave, arcuate configuration.

5. The structure of claim 1 wherein each of said power units includes solenoid means for injecting compressed air through at least one of said intake orifice means into the space between said housing means and rotor, between said piston face and said gate means, at selected times, respectively.

References Cited by the Examiner

UNITED STATES PATENTS

| | | | |
|---|---|---|---|
| 1,135,648 | 4/15 | Ahlm et al. | 123—8 |
| 1,402,057 | 1/22 | Davis | 123—14 |
| 1,575,860 | 3/26 | Monk | 123—14 |
| 1,632,531 | 6/27 | Bland | 123—90 |
| 1,639,287 | 8/27 | Davis | 123—90 |
| 1,765,359 | 6/30 | Adamson | 123—90 |
| 1,780,443 | 11/30 | Schumann | 123—8 |
| 1,828,228 | 10/31 | Kempton | 123—14 |
| 1,923,500 | 8/33 | Northey | 123—8 |
| 1,974,282 | 9/34 | Kempton | 123—14 |
| 1,999,187 | 4/35 | Gerlat et al. | 123—14 |
| 2,040,036 | 5/36 | Weeks | 123—8 |
| 2,473,785 | 6/49 | Cate | 123—8 |

KARL J. ALBRECHT, *Primary Examiner.*

JOSEPH H. BRANSON, Jr., *Examiner.*